Feb. 9, 1932.   F. SALATHE, JR   1,844,372

TREE SURGERY

Filed May 13, 1931

INVENTOR
F. SALATHE JR.
By Hazard and Miller
ATTORNEYS

Patented Feb. 9, 1932

1,844,372

UNITED STATES PATENT OFFICE

FREDERICK SALATHE, JR., OF LOS ANGELES, CALIFORNIA, ASSIGNOR TO GEORGE K. FREEMAN, OF SANTA BARBARA, CALIFORNIA

TREE SURGERY

Application filed May 13, 1931. Serial No. 537,033.

My invention relates to tree surgery, and in particular to the treatment of trees having decayed or damaged portions of the trunk or branches.

It is an object of this invention to remove such portions of the tree and to sterilize and disinfect the wood adjacent to the decayed or damaged portions, so as to destroy fungus growth and bacteria causing decay, and then optionally to fill the cavity formed by the removal of the decayed or damaged portions with a composition which will assist in the exclusion of moisture through condensation or extraneous water, or leave it hollow, and them to hermetically seal the opening of the cavity after the composition has been applied.

For this purpose, one of the principal steps of my method of treating a tree is the carbonization of the walls of the cavity in the trunk or the branch of the tree. A flame having an intense heat is applied so as to destroy any remaining fungus growth or bacteria which may be present in the walls of the cavity, and at the same time form a carbon lining for the cavity, which, as will be hereinafter explained, serves as a medium not only for the reception of a disinfectant to be subsequently applied, but also permits the firm bonding between the walls of the cavity and the water proof protective coating applied to the carbon lining.

With the above and other objects in view, which will appear as the description proceeds, my invention consists in the steps of the method hereinafter described and claimed.

In the accompanying drawings, which form a part of the specification, I have illustrated the successive steps of the method, and in which.

Figure 1:
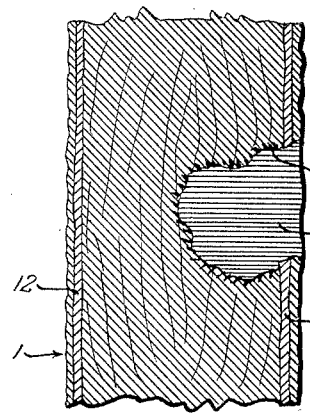
Fig. 1 is a vertical cross section of a section of a tree trunk showing a cavity partially filled with decayed wood.
Figure 2:
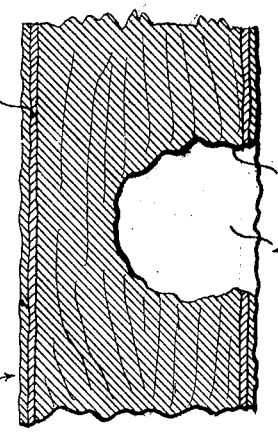
Fig. 2 is a similar view after the removal of the decayed wood.
Figure 3:
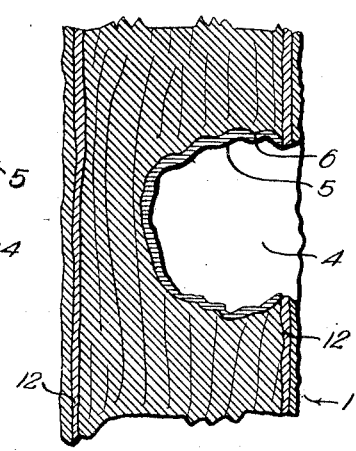
Fig. 3 is a similar view after the carbonizing operation, showing the carbon lining.
Figure 4:
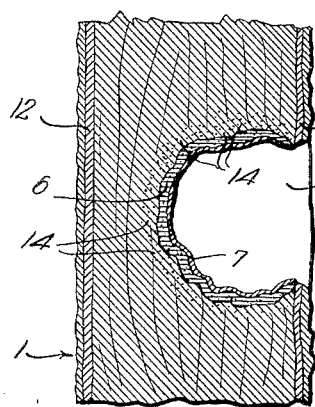
Fig. 4 is a view similar to Fig. 3 after the application of the disinfectant and the water proofing.
Figure 5:
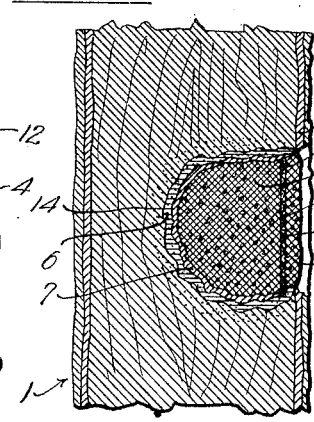
Fig. 5 is a similar view showing the cavity filled with a plastic composition and also the finishing layers.

Referring to the drawings, 1 indicates a trunk of a tree having a cavity 2 formed by the decay of wood portions, in which the shaded portions 3 indicate decayed wood. The decayed wood portions 3 are removed by any suitable methods, preferably by portable power driven tools, leaving a cavity 4 in which the walls are designated by the numeral 5. To the walls 5, which are preferably cut smooth, a torch producing an exceedingly high temperature, say from 3000 to 5800 degrees F., is applied for a sufficient period, which may be from a fraction of a second to twenty minutes, depending upon the character of the wood, the object being to quickly carbonize a layer 6 of the wall 5 without injuring the tree, and at the same time destroy any fungus growth and bacteria that may have infiltrated into the wood adjacent to the wall 5, and also to burn out the narrow fingers of decayed wood or fungus infected wood sometimes running through the sound wood, thereby eliminating the necessity of cutting out large portions of sound wood and thus preventing impairing the strength of the structure of the trunk or limb. The layer of carbon 6 is approximately $\frac{1}{16}$ to $\frac{1}{4}$ of an inch in thickness.

A suitable disinfecting liquid of high penetrating properties, such as creosote preparations or derivatives, is now applied with a brush or spray gun to the carbon layer 6. Carbon, as well known, has excellent properties of absorption of gas and liquids, and therefore, the carbon layer 6 will serve to absorb and hold the disinfecting solution which may to some extent penetrate the wood adjacent the carbon layer 6, and is indicated by the shaded portions and the numeral 14. The next step is to apply to the carbon layer 6, which may be dry or still slightly moist, a coat of water proofing such as an asphaltum paint or varnish, forming a coating 7. The purpose of the coating 7 is to seal up any minute cracks which may be present in the layer of carbon 6, and also to confine the disinfectant 14 absorbed by the carbon layer and wood adjacent thereto and prevent condensation of water on the layer of carbon 6 and in general to thoroughly and permanently water proof the walls of the cavity. The carbon layer 6 acts as an excellent bond far superior to the untreated wood of the tree for the coating 7 which will not peel or crack.

The cavity 4 is now filled with a suitable plastic self-hardening elastic composition, the object being to exclude water and assist in the making of a hermetic seal around the edges of the mouth of the cavity. I have found suitable for this purpose a composition made of asphaltum, preferably gilsonite, ten parts; and diatomaceous earth seven parts; to which is added from 2½ to 15 percent of lime sludge derived from the purification of sugar juices in beet sugar factories. The diatomaceous earth gives lightness and insulating value to the composition and prevents softening or flowing of asphaltum under the sun's heat, and the lime sludge toughens the asphaltum and gives it greater resiliency. The asphaltum is heated to about 600 degrees F. maximum, and the diatomaceous earth and lime sludge, which must be dry, are gradually added and mixed in, the composition being kept hot while being mixed. When thoroughly mixed, it is allowed to cool to a workable temperature and consistency which permits molding, but will not flow or sag when put in place in the cavity. The composition is heated to a plastic condition and then applied to the cavity to fill the same, or a plastic composition may be molded to fit the cavity and the outer surface adjacent thereto is softened by a flame and pressed into place, just flush with the edge and sealing the same. The plastic composition 8 in the cavity 2 may not completely fill the same but leave an outer shallow recess 9 on the outer face 8' of the plastic composition 8 and wire mesh screen 10, preferably of about 12 to 16 mesh, may be placed thereon on which a plastic composition 11 similar to composition 9 but richer in asphaltum, is applied; the outer face of which is substantially flush with the wood edges of the cavity, taking care not to cover the cambium layer 12 of the tree, in order to hermetically seal the cavity. The wire screen 10 forms a flexible foundation for the outer composition 11.

Figure 6:
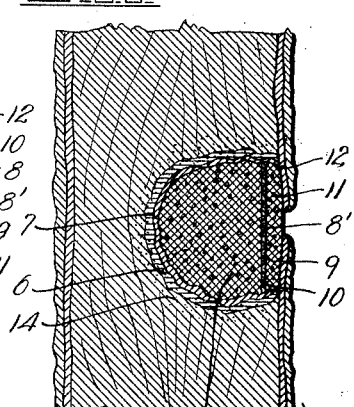
Fig. 6 is a similar view to Fig. 5, showing the growth formed by the cambium layer over the edges of the mouth of the filled cavity.

In this manner the decayed or damaged portions of the tree are removed, and the cavity or cut is sterilized, disinfected, and provided with a flexible water proof coating, and the cavity is hermetically sealed but leaving the cambium layer 12 adjacent to the bark free to grow over the mouth of the cavity as shown in Fig. 6. If desired a layer of colored hydraulic cement or the like may be applied on the surface of the layer 11 and manipulated to simulate the bark in shape and color.

Figure 7:
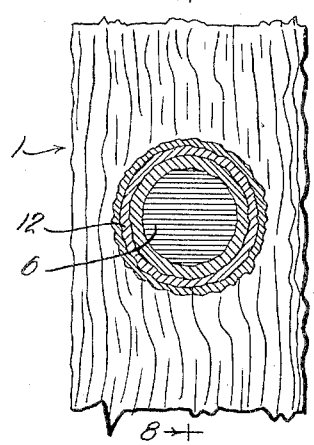
Fig. 7 is a front view of a section of a tree trunk showing a cut surface left by the removal of a branch.
Figure 8:
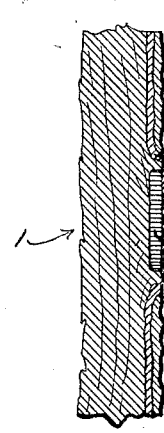
Fig. 8 is a vertical cross section thereof showing the carbon layer and the water proofing coating.
Figure 9:
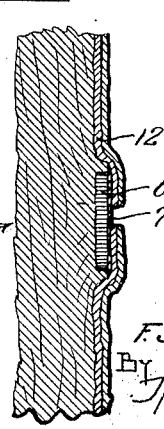
Fig. 9 is a similar view to Fig. 8, showing the growth of the cambium layer partially covering the cut surface.

The step of carbonizing a cut portion of the wood of the tree may also be applied where branches are cut off, as shown in Figs. 7, 8 and 9. The cut portion of the branch is carbonized, as indicated in Fig. 8, care being taken to leave a small margin of wood (over which the cambium will quickly heal) adjacent to the bark, uncarbonized, so as not to injure the cambium layer 12, and that the latter may not be overheated and destroyed. The carbonized portion, after being treated with a disinfectant as described above, is now painted over with a water proofing coating similar to the varnish 7 in the cavity. The cut treated in this manner will permit the cambium layer to grow usually from the two sides, gradually closing together over the wound, and in the course of time, unless the cut is too large, completely covering the same.

It will be understood that other improved methods in common practice, such as bolting, may be used in the cavity to reinforce the tree where the cavity is so large that reinforcing is desirable to strengthen the trunk or branch or the tree in the region of excavation. As stated before, the plastic composition 9 may be omitted. It is not necessary to use a wire mesh for sealing the cavity, but the composition may be brought out flush with the wood edge.

While I usually prefer to employ the step of carbonizing the wood as described, good results are also obtained when the carbonization is omitted and the cavity is filled with my improved asphaltic composition, care being taken to hermetically seal the cavity. Also, the step of applying a disinfectant to the walls of the cavity may be omitted, though it is preferred to use the disinfectant in view of the fact that its application involves little additional labor and expense.

Various changes in the steps of the method may be made by those skilled in the art without departing from the spirit of my invention as claimed.

I claim:

1. A method of tree surgery comprising cutting away the decayed or damaged portion of the wood of a tree to form a cavity, applying a flame having a temperature of 3000 to 5800 degrees F. to the walls of the cavity to sterilize the same and carbonize the outer layer thereof, and applying a water proof coating to the carbonized layer.

2. A method of tree surgery comprising cutting away the decayed or damaged portion of the wood of a tree to form a cavity having smooth walls, applying intense heat to the walls of the cavity to sterilize the same and carbonize the outer layer thereof, applying a disinfecting fluid to the carbonized layer, applying a water proof coating to the carbonized layer, filling the cavity with an elastic water proof plastic composition, applying a wire screen over the exposed face of the plastic composition, and applying a second water proof elastic plastic composition on the screen substantially flush with the contour of the tree.

3. A method of tree surgery comprising cutting away the decayed or damaged portion of the wood of a tree to form a cavity having smooth walls, applying intense heat to the walls of the cavity to sterilize the same and carbonize the outer layer thereof, applying a disinfecting fluid to the carbonized layer, filling the cavity with an elastic water proof plastic composition, applying a wire screen over the exposed face of the plastic composition, and applying a second water proof elastic plastic composition on the screen substantially flush with the contour of the tree but leaving the cambium layer adjacent to the wood uncovered by the plastic composition.

4. A method of tree surgery comprising cutting away the decayed or damaged portion of the wood of a tree to form a cavity having smooth walls, applying intense heat to the walls of the cavity to sterilize the same and carbonize the outer layer thereof, applying a creosote derivative fluid to the carbonized layer, applying an asphaltum varnish to the carbonized layer, and filling the mouth of the cavity with a water proof elastic plastic composition forming a hermetic seal along the edges thereof.

5. A method of tree surgery comprising cutting the diseased or damaged portion of a tree to form a cavity having smooth walls, applying intense heat to the walls of the cavity to sterilize the same and carbonize the outer layer thereof, applying a creosote derivative fluid to the carbonized layer, applying an asphaltum varnish on the carbonized layer, filling the cavity with a plastic composition made of asphaltum, diatomaceous earth, and lime sludge, applying a wire screen to the exposed face of said plastic composition, and applying a second composition relatively richer in asphaltum than said first composition on said wire screen to form a hermetic seal with the mouth of the cavity but leaving the cambium layer uninjured and free to grow inwardly over the edges of the mouth of the cavity.

6. A method of tree surgery comprising applying a disinfecting fluid to the walls of a cavity of the tree, filling the cavity with an elastic waterproof plastic composition, applying a wire screen over the exposed face of the plastic composition, and applying a second waterproof elastic plastic composition on the screen substantially flush with the contour of the tree but leaving the cambium layer adjacent to the wood uncovered by the plastic composition.

7. A method of tree surgery comprising filling a cavity of a tree with a plastic composition made of asphaltum, diatomaceous earth and lime sludge, and forming a hermetic seal with the mouth of the cavity but leaving the cambium layer uninjured and free to grow inwardly over the edges of the mouth of the cavity.

8. A method of tree surgery comprising filling a cavity of a tree with a plastic composition made of asphaltum, a diatomaceous earth and lime sludge, applying a wire screen to the exposed face of said plastic composition, and applying a second composition relatively richer in asphaltum than said first composition on said wire screen to form a hermetic seal with the mouth of the cavity but leaving the cambium layer uninjured and free to grow inwardly over the edges of the mouth of the cavity.

9. A method of tree surgery comprising applying a flame of 3000 to 5800 degrees F. to a decayed or damaged portion of the wood of a tree to sterilize the same and carbonize the layer of the exposed wood of the tree, and applying a waterproof coating thereto.

In testimony whereof I have signed my name to this specification.

FREDERICK SALATHE, Jr.